US012763690B2

(12) United States Patent
Yan et al.

(10) Patent No.: US 12,763,690 B2
(45) Date of Patent: Oct. 13, 2026

(54) CURRENT-LIMITING CIRCUIT OF FLYBACK CONVERTER AND FLYBACK CONVERTER

(71) Applicant: MSJ SYSTEMS LLC, Milpitas, CA (US)

(72) Inventors: Liang Yan, Milpitas, CA (US); Peng Li, Milpitas, CA (US)

(73) Assignee: MSJ SYSTEMS LLC, Milpitas, CA (US)

( * ) Notice: Subject to any disclaimer, the term of this patent is extended or adjusted under 35 U.S.C. 154(b) by 170 days.

(21) Appl. No.: 18/892,589

(22) Filed: Sep. 23, 2024

(65) Prior Publication Data

US 2025/0015721 A1 Jan. 9, 2025

Related U.S. Application Data

(63) Continuation of application No. PCT/CN2022/093300, filed on May 17, 2022.

(51) Int. Cl.

| | |
|---|---|
| ***H02M 3/335*** | (2006.01) |
| ***H02M 1/00*** | (2007.01) |
| ***H02M 1/32*** | (2007.01) |

(52) U.S. Cl.

CPC ..... *H02M 3/33523* (2013.01); *H02M 1/0009* (2021.05); *H02M 1/32* (2013.01); *H02M 3/33592* (2013.01)

(58) Field of Classification Search

CPC ......... H02M 3/33523; H02M 3/33592; H02M 3/33507; H02M 1/0009; H02M 1/32

See application file for complete search history.

(56) References Cited

U.S. PATENT DOCUMENTS 6,972,969 B1 12/2005 Shteynberg et al.
7,443,700 B2 10/2008 Yan et al.
(Continued)

FOREIGN PATENT DOCUMENTS

CN 106169863 A 11/2016
CN 106992686 A 7/2017
(Continued)

OTHER PUBLICATIONS

International Search Report of PCT Patent Application No. PCT/CN2022/093300 issued on Sep. 29, 2022.
(Continued)

*Primary Examiner* — Sisay G Tiku

(57) ABSTRACT

The invention relates to a current-limiting circuit of a flyback converter, and a flyback converter. The converter comprises a power input end, a power output end, a transformer, a rectifier circuit and a switch unit. The current-limiting circuit comprises a first current measurement unit, a second current measurement unit, a first divider, a second divider, a delay unit, a comparison unit and a drive unit. A first input end of the first divider is connected to the second current measurement unit, a second input end of the first divider is used for inputting a target current value, the second divider is connected to the first divider and the delay unit. The comparison unit is connected to the delay unit, the first current measurement unit, and the drive unit, and an output end of the drive unit is used for connecting to a control end of the switch unit.

20 Claims, 12 Drawing Sheets

(56) References Cited

U.S. PATENT DOCUMENTS

| | | | | |
|---|---|---|---|---|
| 7,974,107 | B2 * | 7/2011 | Li | H02M 3/33523 363/21.16 |
| 2006/0055433 | A1 * | 3/2006 | Yang | H02M 3/33507 327/10 |
| 2008/0112193 | A1 | 5/2008 | Yan et al. | |
| 2008/0259654 | A1 * | 10/2008 | Huynh | H02M 3/33523 363/21.16 |
| 2011/0228571 | A1 * | 9/2011 | Lin | H02M 3/33523 363/21.16 |
| 2013/0033197 | A1 * | 2/2013 | Hwang | H05B 45/382 315/307 |
| 2013/0063039 | A1 | 3/2013 | Hwang et al. | |
| 2016/0105116 | A1 * | 4/2016 | Chang | H02M 3/33523 363/21.13 |
| 2017/0163162 | A1 * | 6/2017 | Chang | H02M 3/33523 |

FOREIGN PATENT DOCUMENTS

| | | | | |
|---|---|---|---|---|
| CN | 111193405 | A | | 5/2020 |
| JP | 2010284031 | A | * | 12/2010 |
| JP | 2011091888 | A | | 5/2011 |

OTHER PUBLICATIONS

Written Opinion of PCT Patent Application No. PCT/CN2022/093300 issued on Aug. 12, 2024.

* cited by examiner

CURRENT-LIMITING CIRCUIT OF FLYBACK CONVERTER AND FLYBACK CONVERTER

CROSS REFERENCE TO RELATED APPLICATIONS

The present application is a Continuation Application of PCT Application No. PCT/CN2022/093300 filed on May 17, 2022, the contents of which are incorporated herein by reference in their entirety.

TECHNICAL FIELD

The invention relates to the technical field of switching power supplies, in particular to a current-limiting circuit of a flyback converter and a flyback converter.

DESCRIPTION OF RELATED ART

A flyback converter is widely used because of its simple structure and low cost. FIG. 11 is a schematic diagram of a typical flyback converter circuit. The circuit mainly comprises a primary main switch S1, a transformer TX1 provided with a primary winding Np and a secondary winding Ns, and an output rectifier D1. The control circuit output signal DRV is a pulse width modulated signal. When the DRV is at high potential, the main switch S1 is turned on, and the transformer TX1 stores energy from the input Vin. When the main switch S1 is turned off, the transformer TX1 releases energy to the output through the rectifier D1.

During the operation of the flyback converter, in order to protect the load and the rectifier D1, the current flowing through the secondary winding Ns should be limited within the rated capacity of the load and the rectifier D1. Here are several traditional methods.

In the method shown in FIG. 12, the signal Io_sense is obtained by detecting the output current Io. And compare the Io_sense with the output current reference signal Io_ref to obtain an error signal err. After the PI module performs loop compensation on the error signal (taking proportional-integral compensation as an example), the PI module generates a control signal to adjust the output current to be close to the current value set by the current reference signal by controlling the duty cycle of the main switch S1. This approach limits the converter output current, but requires loop compensation. Because the system stability needs slow speed, and the method can only control the output current, it cannot directly control the secondary winding current. Therefore, the occurrence of a transient large current cannot be prevented. At the same time, the loop compensation increases the cost of components.

A U.S. Pat. No. 6,972,969 B1, titled "System and Method for Controlling Current Limit with Primary Side Sensing". The method uses the relationship between output current and power $$I_o = \frac{P_o}{V_o} = \frac{V_{in}^2}{2L_m}\frac{T_{on}^2}{T_pV_o} \times \eta,$$

where Po is the output power, Vin is the input voltage, Lm is the primary winding magnetizing inductance of the transformer, Ton is the turn-on time of S1,Tp is the switching period and η is the conversion efficiency. By knowing or detecting Vin, Lm, Tp and Vo, and the target output current Io, the required turn-on time can be calculated to achieve current control. Compared with the above method, fast current-limiting during the switching period can be achieved without loop compensation. However, there are many parameters that need to be known or detected, and it is prone to produce large errors. At the same time, this method only limits the output current, and cannot control the secondary winding current in real time.

A U.S. Pat. No. 7,443,700 B2, titled "On-Time Control for Constant Current Mode in a Flyback Power Supply". In the method, the peak control voltage $$V_{pp}(n) = \frac{\text{NUM\_TON\_CC}}{T_R(n-1)}$$

is calculated by using the geometric relationship of the output current and the peak current control mode and by detecting the demagnetization time $T_R$ of the transformer. Where $$\text{NUM\_TON\_CC} = \frac{2T_sI_{As}R_s}{N},$$

wherein $T_R$ (n−1) is the transformer demagnetization time in the previous period; Vpp (n) is the peak control voltage required in the next period; Ts is the switching period; Rs is the sampling resistor of the primary current Ip; N is the primary to secondary turns ratio of the transformer; $I_{AS}$ is the target output current. This approach achieves fast current-limiting during the switching period without loop compensation and limits the secondary current. However, if the circuit parameters change, there is no real-time detection of the output current in this method, and the current error cannot be detected to adjust the control results in real time. At the same time, this method is based on the geometric relationship of the current in the discontinuous operation mode of the transformer, which will produce a large error in the continuous operation mode of the transformer.

BRIEF SUMMARY OF THE INVENTION

The technical problem to be solved by the present invention is to provide a current-limiting circuit of a flyback converter and a flyback converter to overcome the above defects of the conventional control method.

According to the technical scheme, a current-limiting circuit of a flyback converter is provided; the converter comprises a power supply input end, a power supply output end, a transformer, a rectifier circuit and a switch unit. A first end of the primary input of the transformer is connected to the power input end, A second end of the primary input of the transformer is connected to a first end of the switch unit, A first end of the secondary output of the transformer is connected to the input end of the rectifier circuit, the output end of the rectifier circuit is connected to the power output end, and a second end of the secondary output of the transformer is grounded;

The current-limiting circuit comprises a first current measurement unit, a first divider, a second divider, a delay unit, a comparison unit and a drive unit, wherein the first current measurement unit is used for acquiring primary input current of the transformer, and the second current measurement unit is used for acquiring secondary output current of the transformer;

A first input end of the first divider is connected to the second current measurement unit, a second input end of the first divider is used for inputting a target current value of the converter, an output end of the first divider is connected to a first input end of the second divider, and a second input end of the second divider is connected to the output end of the delay unit; an output end of the second divider is connected to the input end of the delay unit;

A first input end of the comparison unit is connected to the output end of the delay unit, a second input end of the comparison unit is connected to the first current measurement unit, the output end of the comparison unit is connected to the input end of the drive unit, and the output end of the drive unit is used for being connected to the control end of the switch unit.

Optionally, in the current-limiting circuit of a flyback converter of the present invention, the first current measurement unit comprises a detection resistor, a first end of the detection resistor is connected to the second end of the switch unit and the inverting input end of the comparison unit, and a second end of the detection resistor is grounded.

Optionally, in the current-limiting circuit of a flyback converter of the present invention, the second current measurement unit comprises a first sampling resistor, a first differential amplifier and a first averaging unit;

A first end of the first sampling resistor is connected to the output end of the rectifier circuit and the non-inverting input end of the first differential amplifier, a second end of the first sampling resistor is connected to the positive voltage output of the power output end and the inverting input end of the first differential amplifier, and the output end of the first differential amplifier is connected to the input end of the first averaging unit; The output end of the first averaging unit is connected to the first input end of the first divider.

Optionally, in the current-limiting circuit of a flyback converter of the present invention, the second current measurement unit further comprises a first isolation unit;

The input end of the first isolation unit is connected to the output end of the first differential amplifier, and the output end of the first isolation unit is connected to the input end of the first averaging unit.

Optionally, in the current-limiting circuit of a flyback converter of the present invention, the second current measurement unit comprises a second sampling resistor, a second differential amplifier and a second averaging unit. A first end of the second sampling resistor is connected to the second end of the secondary output of the transformer and the inverting input end of the second differential amplifier, a second end of the second sampling resistor is connected to the negative voltage output of the power output end and the non-inverting input end of the second differential amplifier, and the output end of the second differential amplifier is connected to the input end of the second averaging unit; The output end of the second averaging unit is connected to the first input end of the first divider, or The second current measurement unit comprises a third differential amplifier, a third averaging unit and a second isolation unit, wherein the non-inverting input end of the third differential amplifier is connected to the input end of the rectifier circuit, the inverting input end of the third differential amplifier is connected to the output end of the rectifier circuit, and the output end of the third differential amplifier is connected to the input end of the second isolation unit; The output end of the second isolation unit is connected to the input end of the third averaging unit, and the output end of the third averaging unit is connected to the first input end of the first divider.

Optionally, in the current-limiting circuit of a flyback converter of the present invention, the second current measurement unit comprises a first waveform analyzing unit and a first controller;

The first controller is respectively connected to the output end of the delay unit, the output end of the comparison unit, the output end of the first waveform analyzing unit and the first input end of the first divider;

The input end of the first waveform analyzing unit is connected to the second end of the primary input of the transformer;

The first controller is configured to obtain the demagnetization time of the transformer according to the peak current control value output by the delay unit, the output period of the comparison unit, and the input voltage of the first end of the switch unit, so as to obtain a voltage detection value corresponding to the mean current of the secondary output of the transformer.

Optionally, in the current-limiting circuit of a flyback converter of the present invention, the first controller outputs the control parameter $V_{is\_r}$ according to the following formula:

$$V_{is\_r} = \frac{V_{ipk\_r} N_{ps}}{2} \frac{T_r}{T_p}$$

Wherein, $V_{ipk\_r}$ is the voltage corresponding to the primary peak current control value of the transformer, $N_{ps}$ is the turns ratio of the primary input to the secondary output of the transformer, $T_r$ is the demagnetization time of the transformer and $T_p$ is the switching period of the switch unit. The demagnetization time $T_r$ of the transformer is obtained according to the input voltage of the first end of the switch unit.

Optionally, in the current-limiting circuit of a flyback converter of the present invention, the converter further comprises an auxiliary winding, and the second current measurement unit comprises a first divider resistor, a second divider resistor, a second waveform analyzing unit and a second controller;

The second controller is respectively connected to the output end of the delay unit, the output end of the comparison unit, the output of the second waveform analyzing unit and the first input end of the first divider;

The input end of the second waveform analyzing unit is connected to a first end of the first divider resistor and a first end of the second divider resistor, and a second end of the first divider resistor is connected to a first end of the auxiliary winding, wherein a second end of the auxiliary winding and a second end of the second divider resistor are grounded;

The second controller is configured to obtain a voltage detection value corresponding to the mean current of the secondary output of the transformer according to the peak current control value output by the delay unit, the output period of the comparison unit, and the demagnetization time of the transformer detected by the auxiliary winding.

Optionally, in the current-limiting circuit of a flyback converter of the present invention, the second controller outputs the control parameter $V_{is\_r}$ according to the following formula:

$$V_{is\_r} = \frac{V_{ipk\_r} N_{ps}}{2} \frac{T_r}{T_p}$$

Wherein, $V_{ipk\_r}$ is the voltage value corresponding to the primary peak current control value of the transformer, $N_{ps}$ is the turns ratio of the primary input to the secondary output of the transformer, $T_r$ is the demagnetization time of the transformer and $T_p$ is the switching period of the switch unit. The demagnetization time $T_p$ of the transformer is obtained according to the voltage of the auxiliary winding.

The invention also provides a flyback converter comprising a power input end, a power output end, a transformer, a rectifier circuit, a switch unit and a current-limiting circuit as described above;

Wherein, a first end of the primary input of the transformer is connected to the power input end, a second end of the primary input of the transformer is connected to a first end of the switch unit, a first end of the secondary output of the transformers is connected to the input end of the rectifier circuit, the output end of the rectifier circuit is connected to the power output end, and a second end of the secondary output of the transformer is grounded;

The current-limiting circuit is connected to the control end of the switch unit.

The current-limiting circuit of a flyback converter and the flyback converter provided by the invention have the beneficial effects that the secondary current detection value and the primary peak current control quantity in the current period can be effectively utilized to correct the control value of the next period, simple and accurate secondary current control is realized, and control errors are reduced in a transformer continuous mode.

BRIEF DESCRIPTION OF THE SEVERAL VIEWS OF THE DRAWINGS

The present invention will be further described with reference to the accompanying drawings and embodiments, in which.

DETAILED DESCRIPTION OF THE INVENTION

In order to have a clearer understanding of the technical features, objectives, and effects of the present invention, the specific embodiments of the present invention will now be described in detail with reference to the accompanying drawings.

Figure 1:
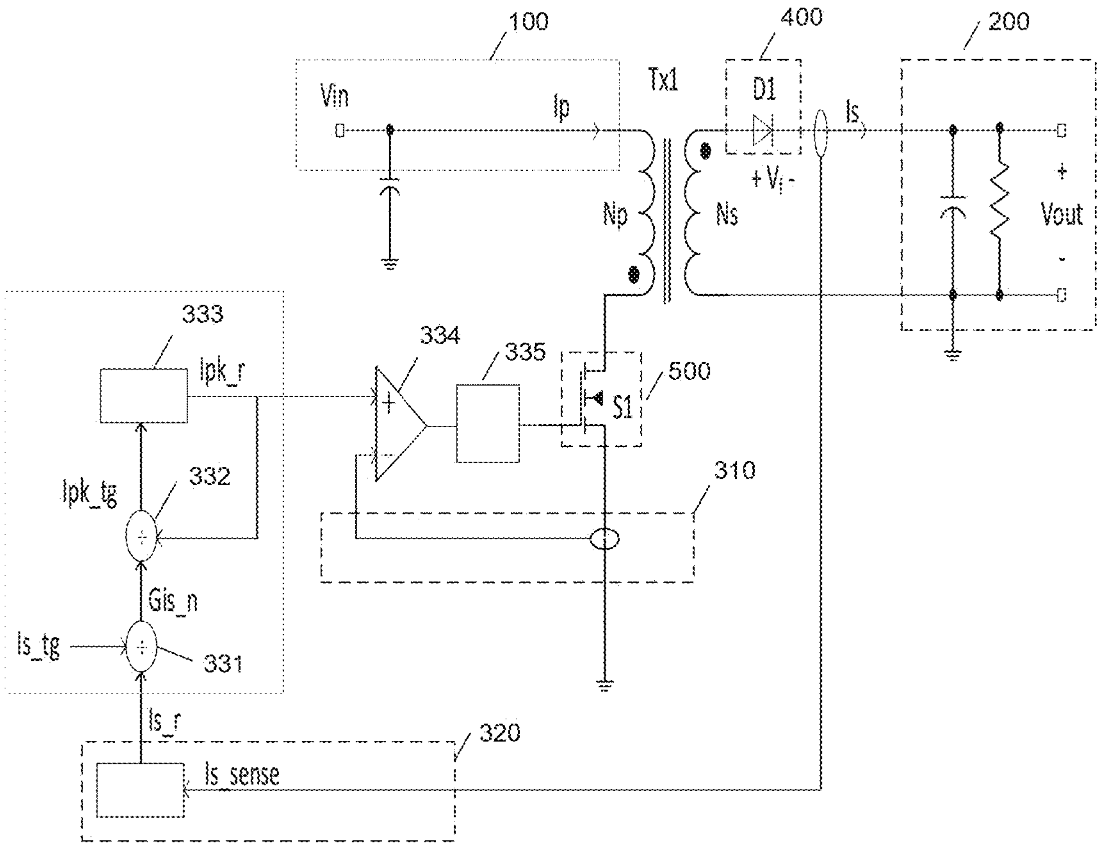
FIG. 1 is a circuit diagram of a current-limiting circuit of a flyback converter according to an embodiment of the present invention.
Figure 2:
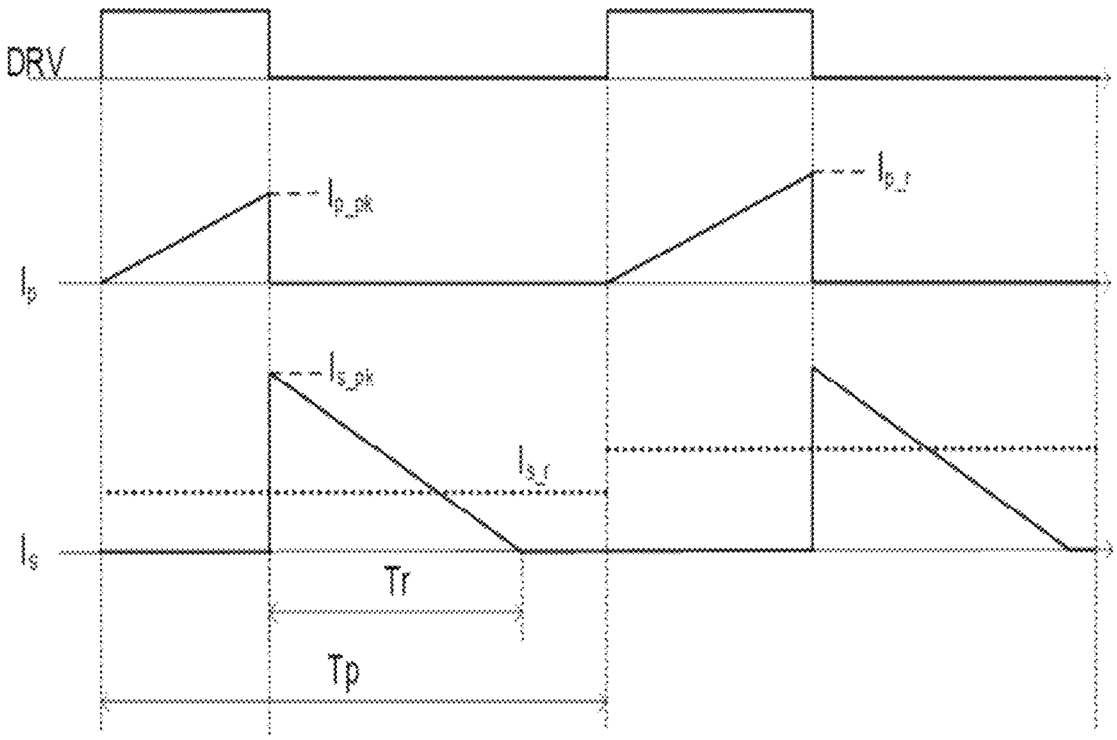
FIG. 2 is a working waveform diagram of a current-limiting circuit of a flyback converter according to an embodiment of the present invention.

As shown in FIG. 1, in a first embodiment of a current-limiting circuit of a flyback converter of the present invention, the converter comprises a power input end 100, a power output end 200, a transformer, a rectifier circuit 400 and a switch unit 500, wherein a first end of the primary input of the transformer is connected to the power input end 100; a second end of the primary input of the transformer is connected to a first end of the switch unit 500, a first end of a secondary output of the transformer is connected to an input end of a rectifier circuit 400, an output end of the rectifier circuit 400 is connected to the power output end 200, and a second end of an secondary output of the transformer is grounded; The current-limiting circuit comprises a first current measurement unit 310 for obtaining the primary input current of the transformer, a second current measurement unit 320 for obtaining the secondary output current of the transformer, a first divider 331, a second divider 332, a delay unit 333, a comparison unit 334 and a drive unit 335; A first input end of the first divider 331 is connected to the second current measurement unit 320, a second input end of the first divider 331 is configured to input a target current value of the converter, an output end of the first divider 331 is connected to a first input end of the second divider 332, a second input end of the second divider 332 is connected to an output end of a delay unit 333, an output end of the second divider 332 is connected to an input end of the delay unit 333; A first input end of the comparison unit 334 is connected to an output end of the delay unit 333, a second input end of the comparison unit 334 is connected to the first current measurement unit 310, an output end of the drive unit 335 is connected to an input end of the drive unit 335, and an output end of the drive unit 335 is used to be connected to a control end of the switch unit 500. Specifically, the switch unit 500 is driven to be turned on or off by the high and low levels output by the drive unit 335, and the energy storage of the primary winding (corresponding to the primary input of the transformer Tx1) of the transformer Tx1 is controlled by the on or off time of the switch unit 500. so as to finally control the current of the secondary winding of the transformer Tx1 (corresponding to the secondary output of the transformer Tx1). As shown in FIG. 2, when the output level DRV of the drive unit 335 is a high level, the switch unit 500 (corresponding to reference numeral S1) is turned on, the primary current $I_p$ in the primary winding Np of the transformer Tx1 increases, and the transformer stores energy. When the output level DRV of the drive unit 335 is a low level, the switch unit 500 is turned off, the current of the primary input of the converter is stopped, at this time, the input current of the power input end 100 of the transformer reaches the peak current $I_{p\_pk}$, and the energy of the transformer is released to the load to form the output current $I_s$ of the secondary output of the transformer. This current is output through the secondary winding of the transformer to the power output end 200. The process of current $I_s$ decreasing from a beginning to zero is called transformer demagnetization (or magnetic recovery). By controlling the peak current $I_{p\_pk}$ on the primary of the transformer, the average current $I_{s\_r}$ during the switching period of the secondary output of the transformer can be controlled. Wherein the output current $I_{s\_r}$ meets the following relationship:

$$I_{s\_r} = \frac{I_{s\_pk}}{2}\frac{T_r}{T_p} \tag{1}$$

Here, $I_{s\_r}$ is the average current of the secondary of the transformer (the current flowing through the rectifier D1) during the switching period; $I_{s\_pk}$ is the peak value of the current of the secondary output of the transformer; $T_r$ is the demagnetization time of the transformer; $T_p$ is the switching period of the switch unit 500; and according to the characteristics of the transformer, there are $$I_{s\_pk} = I_{p\_pk}N_{ps} \tag{2}$$

Here, $I_{p\_pk}$ is the peak value of the primary input current $I_p$ of the transformer (corresponding to the input current at the power input end 100), $N_{ps}$ is the turns ratio of the primary and secondary windings of the transformer, and $$N_{ps} = \frac{N_p}{N_s},$$

therefore, the average value of the current output from the secondary of the transformer in a switching period can be expressed as $$I_{s\_r} = \frac{I_{p\_pk}N_{ps}}{2}\frac{T_r}{T_p} \tag{3}$$

Assuming that the target value of the secondary current of the transformer is $I_{s\_tg}$, according to formula (3), if the ratio of $$\frac{T_r}{T_p}$$

is maintained (when the converter operates at a stable point, the $T_r$ and $T_p$ change very little), the peak value of the primary input current of the transformer needs to be equal to the target value $I_{ipk\_tg}$ in formula (4). So that the current at the secondary of the transformer is equal to the target limit:

$$I_{s\_tg} = \frac{I_{ipk\_tg}N_{ps}}{2}\frac{T_r}{T_p} \tag{4}$$

From formula (3) and formula (4), it follows that $$I_{ipk\_tg} = \frac{I_{s\_tg}}{I_{s\_r}}I_{ipk\_r} \tag{5}$$

Formula (5) indicates that, as long as the average current $I_{s\_r}$ of the secondary output of the transformer and the peak current $I_{ipk\_r}$ of the primary input of the transformer in the current period can be obtained, the peak current value $I_{ipk\_tg}$ required in the next period can be calculated according to the target current $I_{s\_tg}$. The current of the secondary output of the transformer in the next period is made to reach the target limit. According to the principle of peak-value current control, a new $I_{ipk\_tg}$ can determine the turn-on time of the switch unit 500 in the next period. $G_{is\_n}$ is defined as the ratio of the average current of the secondary output of the transformer in the current switching period to the target current:

$$G_{is\_n} = \frac{I_{s\_r}}{I_{s\_tg}} \tag{6}$$

Then there is $$I_{ipk\_tg} = \frac{I_{ipk\_r}}{G_{is\_n}} \tag{7}$$

In the current-limiting circuit, the second current measurement unit 320 is used to obtain the average value $I_{s\_r}$ of the current of the secondary output of the transformer in a period, and obtain the current ratio $G_{is\_n}$ corresponding to the ratio of the average value $I_{s\_r}$ in the current period and the target current $I_{s\_tg}$ through the first divider 331; The second divider 332 obtains the ratio of the current peak value $I_{ipk\_r}$ of the primary input of the transformer to the above current ratio $G_{is\_n}$ to obtain the peak value current control quantity $I_{ipk\_tg}$ in the next period. The control quantity $I_{ipk\_tg}$ is delayed to the next switching period, and the current value of the secondary output of the transformer in the next period can be accurately limited by controlling the control end of the switch unit 335.

Optionally, as shown in FIG. 3 to FIG. 7, in the current-limiting circuit of a flyback converter of the present application, the first current measurement unit 310 comprises a detection resistor, a first end of the detection resistor is connected to a second end of the switch unit 500 (corresponding to S1 in FIG. 3) and an inverting input end of the comparison unit 334, and a second end of the detection resistor is grounded. Specifically, the current of the primary input of the transformer may be obtained through a detection resistor, wherein the detection resistor is connected to the second end of the switch unit 500 and the ground, when the switch unit 500 is turned on, the primary winding of the transformer Tx1 is turned on, and the detection resistor generates a corresponding voltage due to the current flowing, and a corresponding current detection result may be obtained through the voltage detection result. Wherein the sampling resistor corresponds to the resistor Rip in FIGS. 3 to 8.

Figure 3:
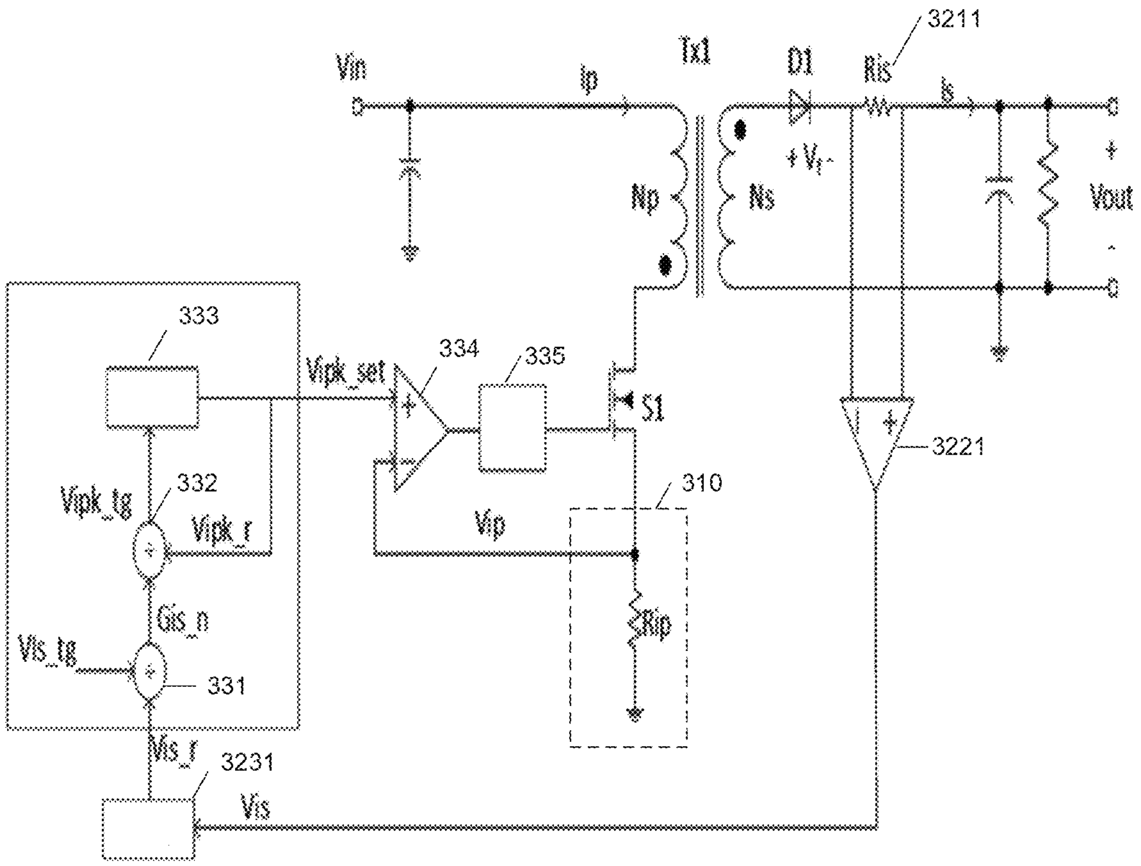
FIG. 3 is a schematic circuit diagram of another embodiment of a current-limiting circuit of a flyback converter accord to the present invention.

As shown in FIG. 3, in an embodiment, the second current measurement unit 320 comprises a first sampling resistor 3211, a first differential amplifier 3221, and a first averaging unit 3231; A first end of the first sampling resistor 3211 is connected to the output end of the rectifier circuit 400 and the non-inverting input end of the first differential amplifier 3221, and a second end of the first sampling resistor 3211 is connected to the positive voltage output of the power output end 200 and the inverting input end of the first differential amplifier 3221. The output of the first differential amplifier 3221 is connected to the input of the first averaging unit 3231, and the output of the first averaging unit 3231 is connected to the first input of a first divider 331. Specifically, the output end of the rectifier circuit 400 can be detected by the first sampling resistor 3211, that is, the detection current of the secondary output of the transformer can be obtained by detecting the current at the positive output of the power output end 200, and the detection current forms a voltage difference at both ends of the first sampling resistor 3211. The voltage difference is amplified by the first differential amplifier 3221 to obtain a corresponding voltage detection result. According to the voltage detection result, the secondary output current detection result of the transformer is obtained. And the detection result is averaged by the first averaging unit 3231 to obtain the mean current detection result of the secondary output of the corresponding transformer. In the specific embodiment shown in FIG. 3, the sampling resistor Rip detects that the current of the primary input of the transformer is converted into a voltage signal $V_{ip}$, and the resistor Ris detects that the rectified current of the secondary output of the transformer is converted into a voltage signal $V_{is}$. Both the current of the primary input of the converter and the current of the secondary output of the transformer can be converted into voltage signals through Rip and Ris, which is convenient for a control system to process. Voltage $V_{is\_r}$ corresponds to current $I_{s\_r}$, and $V_{ipk\_r}$ corresponds to the peak control voltage corresponding to the peak primary current. The voltage $V_{is\_tg}$ is the voltage value corresponding to the target current limit, and in formula (8), $V_{ipk\_tg}$ is the calculated control voltage value of the new peak current required for the next period:

$$I_{ipk\_tg} = \frac{I_{ipk\_r}R_{ip}}{G_{is\_n}} = \frac{V_{ipk\_r}}{G_{is\_n}}. \tag{8}$$

Figure 4:
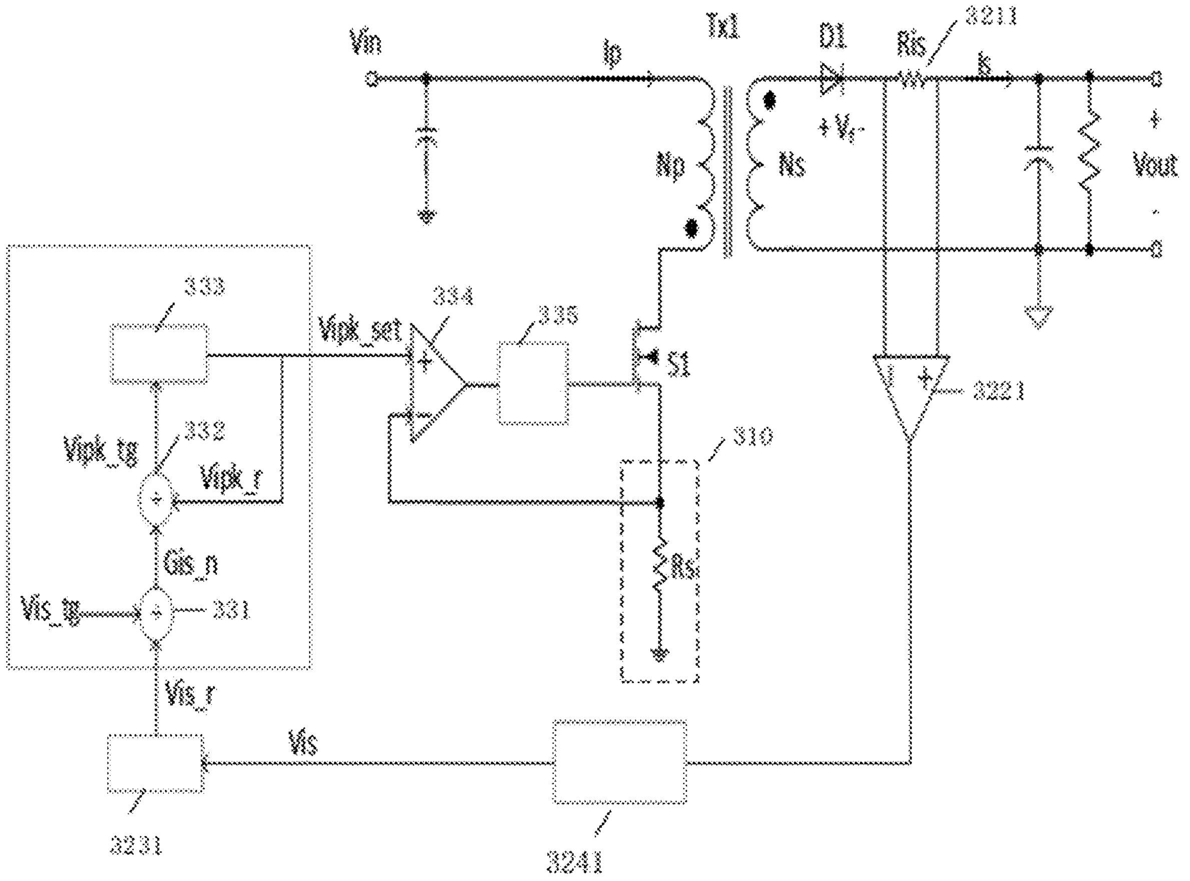
FIG. 4 is a schematic circuit diagram of another embodiment of a current-limiting circuit of a flyback converter to the present invention.

As shown in FIG. 4, in an embodiment, the second current measurement unit 320 further comprises a first isolation unit 3241, an input end of the first isolation unit 3241 is connected to an output end of the first differential amplifier 3221, and an output end of the first isolation unit 3241 is connected to an input end of the first averaging unit 3231. Specifically, when the primary input of the transformer and the secondary output of the transformer are not grounded together, it is also necessary to set the isolation between the primary input of the transformer and the secondary output of the transformer. A first isolation unit 3241 can be set in the second current measurement unit 320, so that the current detection corresponding to the secondary output of the transformer is transmitted to the primary input of the transformer through the first isolation unit 3241, and the first isolation unit 2241 can be realized by adopting optical isolation or magnetic coupling according to application, and typical methods comprise linear optical coupling and amplitude modulation transformer. Or is transmitted by a digital optocoupler after analog-to-digital conversion.

Figure 5:
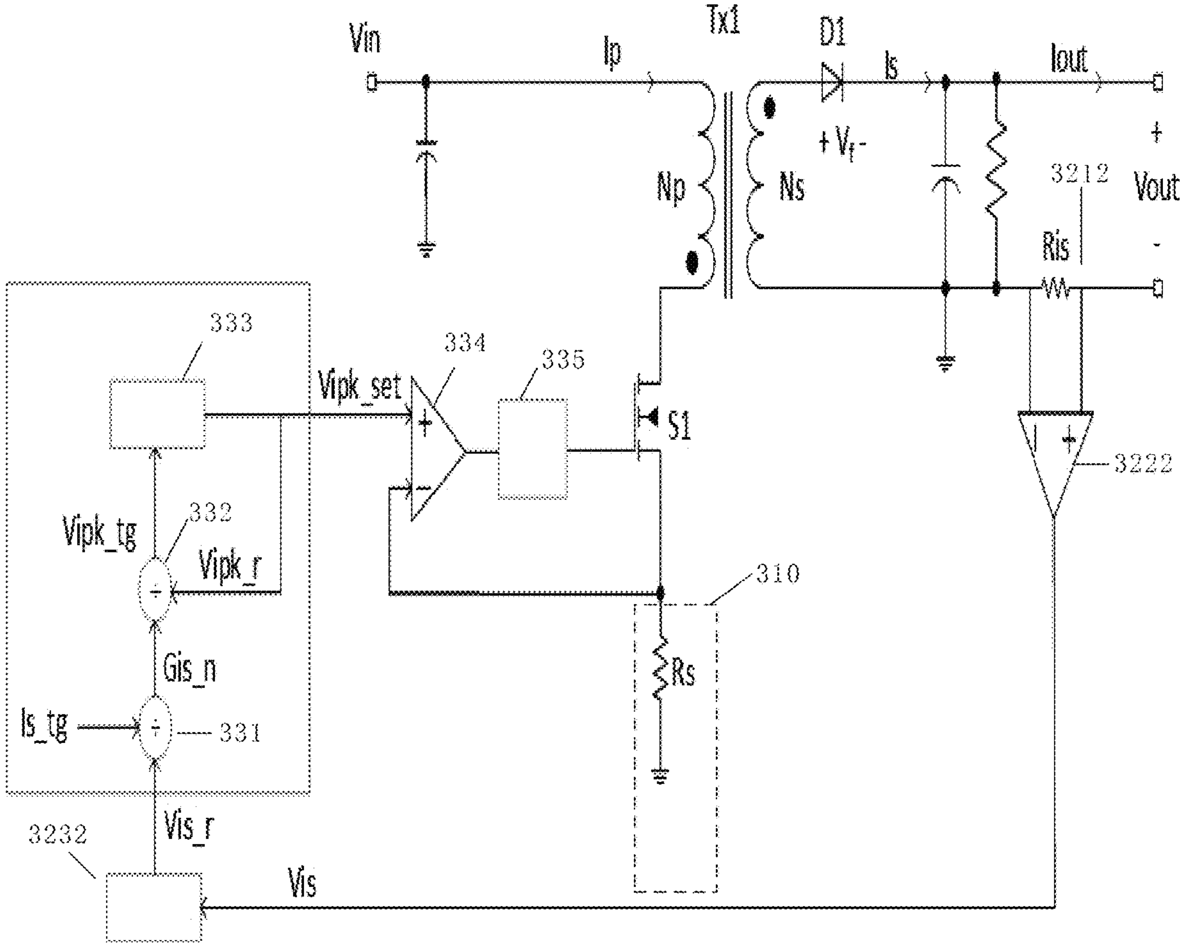
FIG. 5 is a schematic circuit diagram of another embodiment of a current-limiting circuit of a flyback converter to the present invention.
Figure 6:
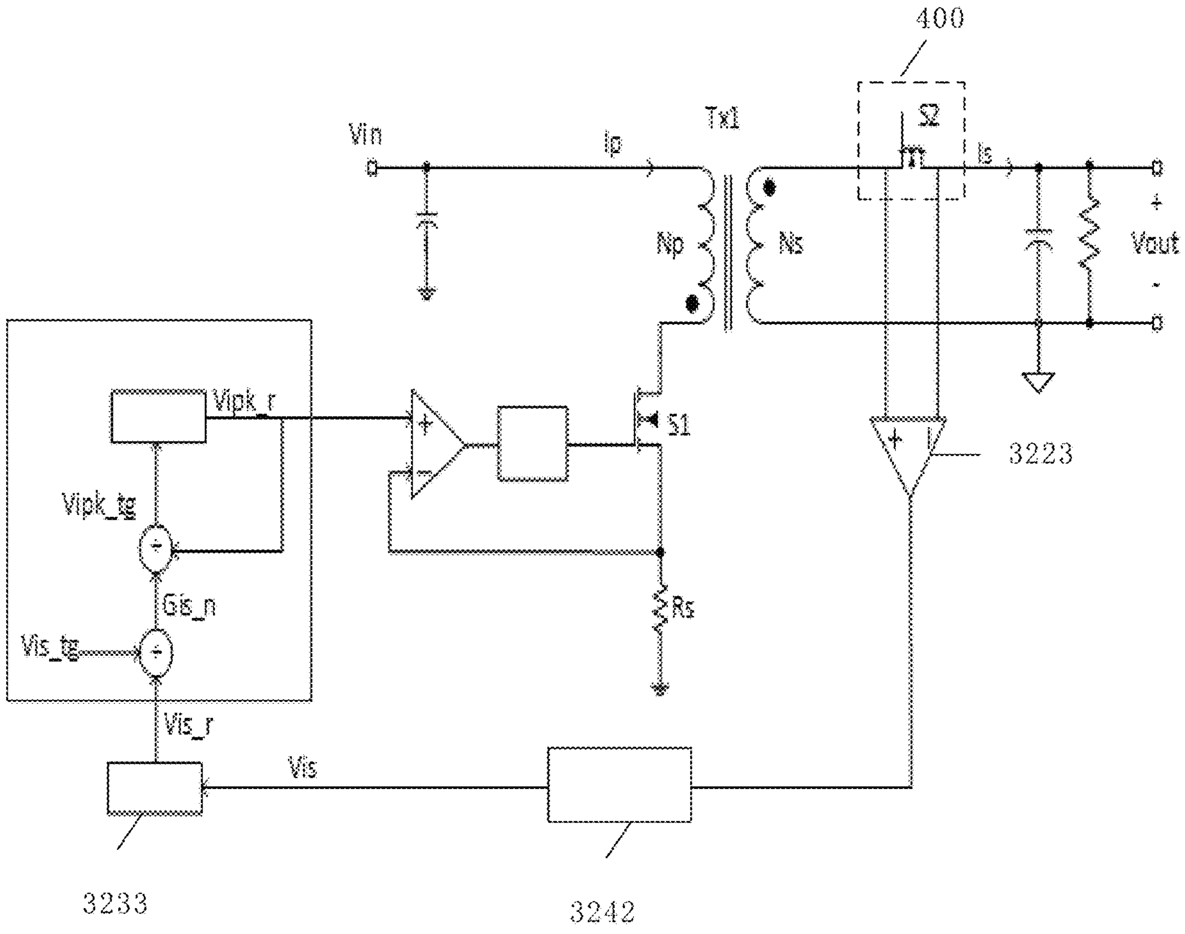
FIG. 6 is a schematic circuit diagram of another embodiment of a current-limiting circuit of a flyback converter to the present invention.

As shown in FIG. 5, in an embodiment, the second current measurement unit 320 comprises a second sampling resistor 3212, a second differential amplifier 3222, and a second averaging unit 3232; The first end of the second sampling resistor 3212 is connected to the second end of the secondary output of the transformer and the inverting input end of the second differential amplifier 3222, and the second end of the second sampling resistor 3212 is connected to the negative voltage output at the power output end and the non-inverting input end of the second differential amplifier 3222. The output of the second differential amplifier 3222 is connected to the input of the second averaging unit 3232, and the output of the second averaging unit 3232 is connected to the first input of the first divider 331. Specifically, the negative output of the secondary winding of the transformer can be detected by the second sampling resistor 3212, that is, the current detection can be performed on the negative output end of the power output end, and the output current forms a voltage difference across the second sampling resistor 3212, and the voltage difference is amplified by the second differential amplifier 3222 to finally obtain a corresponding voltage detection result. According to the voltage detection result, the current detection result of the secondary output of the transformer is obtained. And the second averaging unit 3232 averages the detection result to obtain a corresponding average current detection result. In this embodiment, the current detection of the secondary output of the transformer is indirectly obtained by detecting the output load current, and this process can control the average value of the rectifier circuit 400 by limiting the long-term average load current, but since it cannot limit the current of the secondary output of the transformer in real time, it can be applied to a circuit that needs to control the output current. But has low requirement on the real-time current control of the rectifier circuit 400 (corresponding to the rectifier D1 in FIG. 5).

In the above implementation, the resistor Ris is used to detect current of the secondary output of the transformer. In practical applications, other methods can be used to detect the current of the secondary output of the transformer. In the embodiment shown in FIG. 6, the second current measurement unit 320 comprises a third differential amplifier 3223, a third averaging unit 3233, and a second isolation unit 3242. The inverting input end of the third differential amplifier 3223 is connected to the output end of the rectifier circuit 400, the output end of the third differential amplifier 3223 is connected to the input end of the second isolation unit 3242, and the output end of the second isolation unit 3242 is connected to the input end of the third averaging unit 3233. The output end of the third averaging unit 3233 is connected to the first input end of the first divider. Specifically, when the rectifier circuit 400 is a synchronous rectifier S2, the current detection can be directly realized by using the on-resistance of the synchronous rectifier S2. Namely, no special detection resistor is added, and the efficiency of the converter is improved. The manner in which the detection is performed may refer to the embodiment of FIG. 4.

Figure 7:
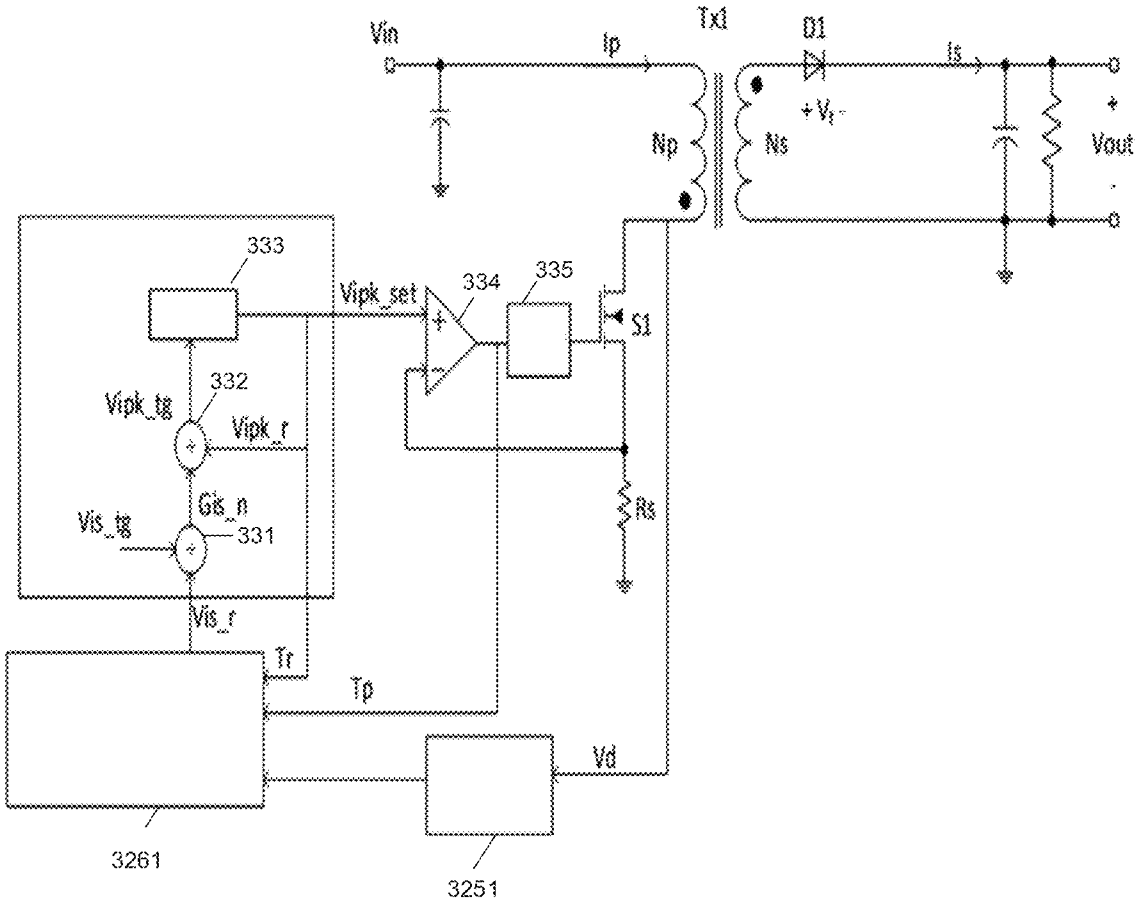
FIG. 7 is a schematic circuit diagram of another embodiment of a current-limiting circuit of a flyback converter to the present invention.

As shown in FIG. 7, in an embodiment, the second current measurement unit 320 comprises a first waveform analyzing unit 3251 and a first controller 3261, where the first controller 3261 is respectively connected to the output end of the delay unit 333, the output end of the comparison unit 334, the output end of the first waveform analyzing unit 3251 and the first input end of the first divider 331; the input end of the first waveform analyzing unit 3251 is connected to the second end of the primary winding of the transformer; The first controller 3261 is configured to obtain the demagnetization time of the transformer according to the control quantity of the primary peak current output by the delay unit 333, the output period of the comparison unit 334, and the input voltage of the first end of the switch unit, so as to obtain a voltage detection value corresponding to the mean current of the secondary output of the transformer. Specifically, in the flyback converter, the demagnetization time $T_r$ of the transformer can be obtained by analyzing the drain voltage $V_d$ of the switch unit 500. The voltage detection value corresponding to the current of the secondary output of the transformer is obtained by the first controller according to the obtained parameters and the following formula $$V_{is\_r} = \frac{V_{ipk\_r}N_{ps}}{2}\frac{T_r}{T_p}. \quad (9)$$

Figure 8:
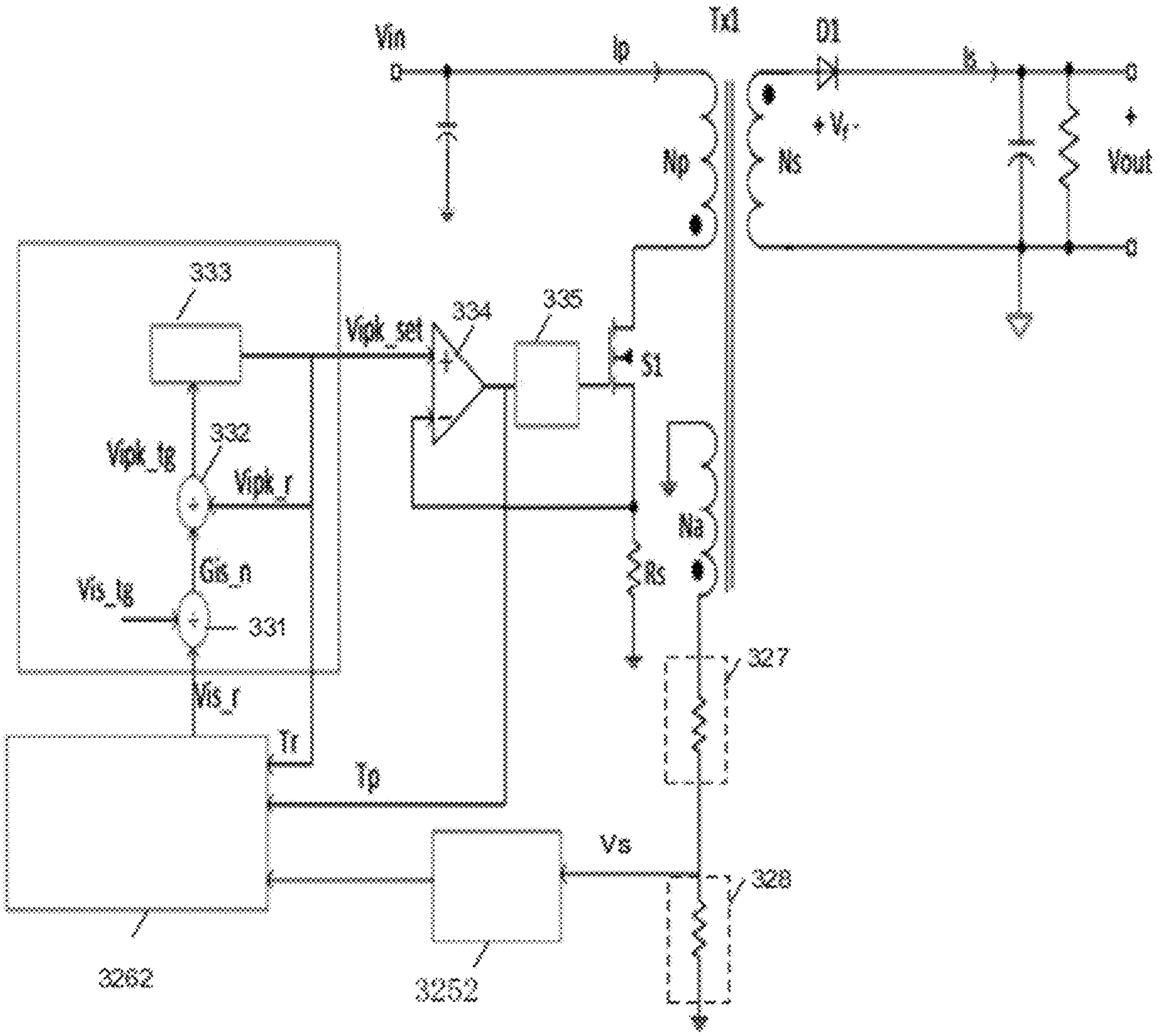
FIG. 8 is a schematic circuit diagram of another embodiment of a current-limiting circuit of a flyback converter to the present invention.

As shown in FIG. 8, in one embodiment, the converter further comprises an auxiliary winding Na, and the second current measurement unit 320 comprises a first voltage divider resistor 327, a second voltage divider resistor 328, a second waveform analyzing unit 3252, and a second controller 3262; The second controller 3262 is respectively connected to the output end of the delay unit 333, the output end of the comparison unit 334, the output end of the second waveform analyzing unit 3252, and the first input end of the first divider 331; The input end of the second waveform analyzing unit 3252 is connected to the first end of the first voltage divider resistor 327 and the first end of the second voltage divider resistor 328. The second end of the first voltage divider resistor 327 is connected to the first end of the auxiliary winding Na, where the second end of the auxiliary winding Na and the second end of the second voltage divider resistor 328 are grounded; wherein, the second controller 362 is used to calculate the voltage detection value corresponding to the current of the secondary output of the transformer based on the control voltage value of the peak current output by the delay unit 333, the output period of the comparison unit 334, and the demagnetization time detected by the auxiliary winding. Specifically, in an isolated flyback converter, the demagnetization time $T_r$ of the transformer can be obtained by using the voltage $V_s$ corresponding to the voltage detection result of the auxiliary winding Na. It obtains the voltage detection value corresponding to the current of the secondary output of the transformer through the second controller based on the obtained parameters and the following formula.

$$V_{is\_r} = \frac{V_{ipk\_r}N_{ps}}{2}\frac{T_r}{T_p}. \quad (9)$$

It can be understood that in the embodiments corresponding to FIG. 7 and FIG. 8, the current of the secondary output can be indirectly calculated by detecting the demagnetization time of the transformer.

Figure 9:
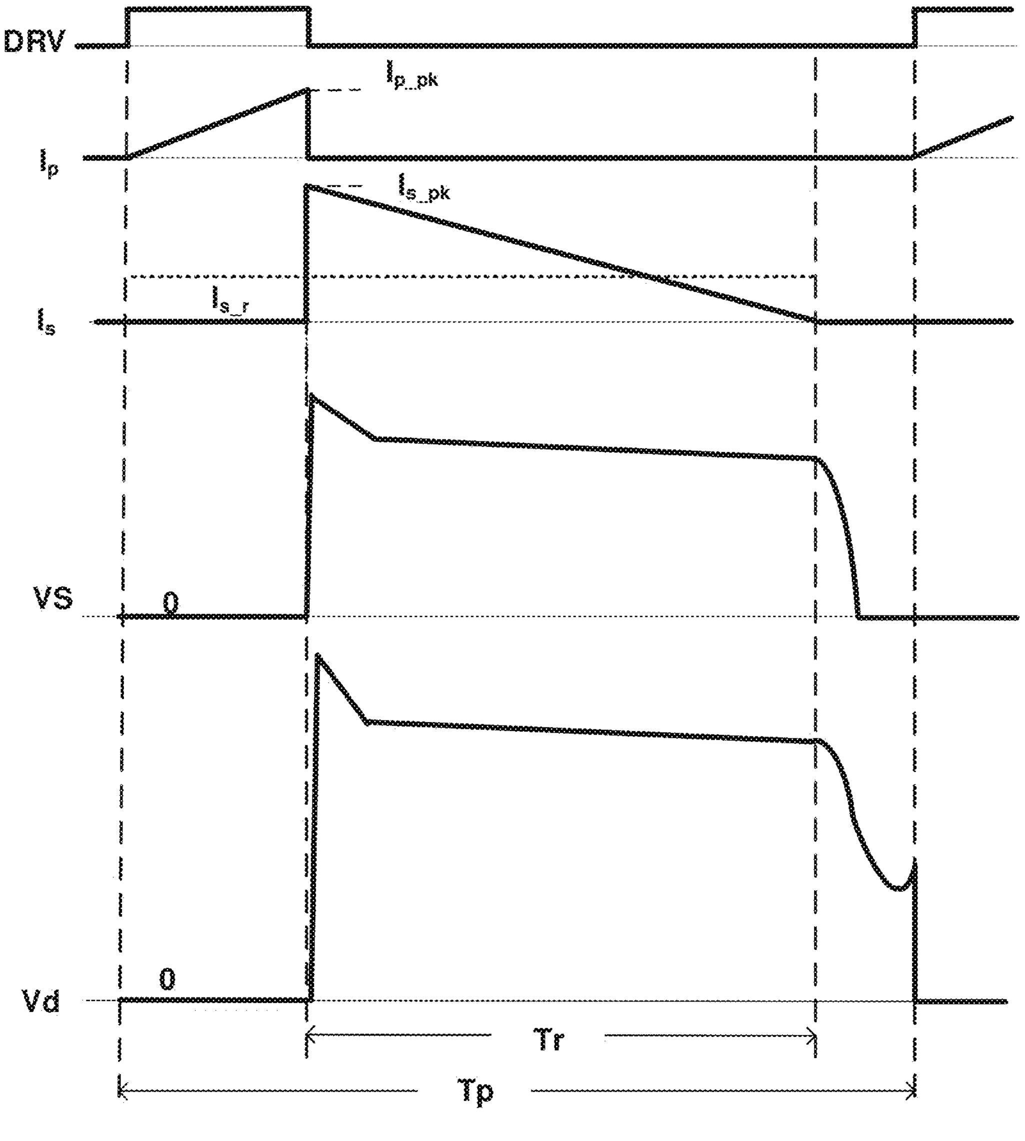
FIG. 9 is a working waveform diagram of a current-limiting circuit of a flyback converter according to another embodiment of the present invention.

FIG. 9 shows the waveform of the transformer operating in the discontinuous mode. In a discontinuous mode, $T_r$ is the demagnetization time of the transformer, and the waveform analyzing unit turns off the drive voltage DRV (from high to low) according to the $V_d$ or $V_s$ until the slope of the output detection voltage $V_d$ or $V_s$ corresponding to the second current measurement unit suddenly changes. $T_p$ is the switching period of the converter operation and can be obtained from the period time of the drive voltage DRV (first rising edge to second rising edge).

Figure 10:
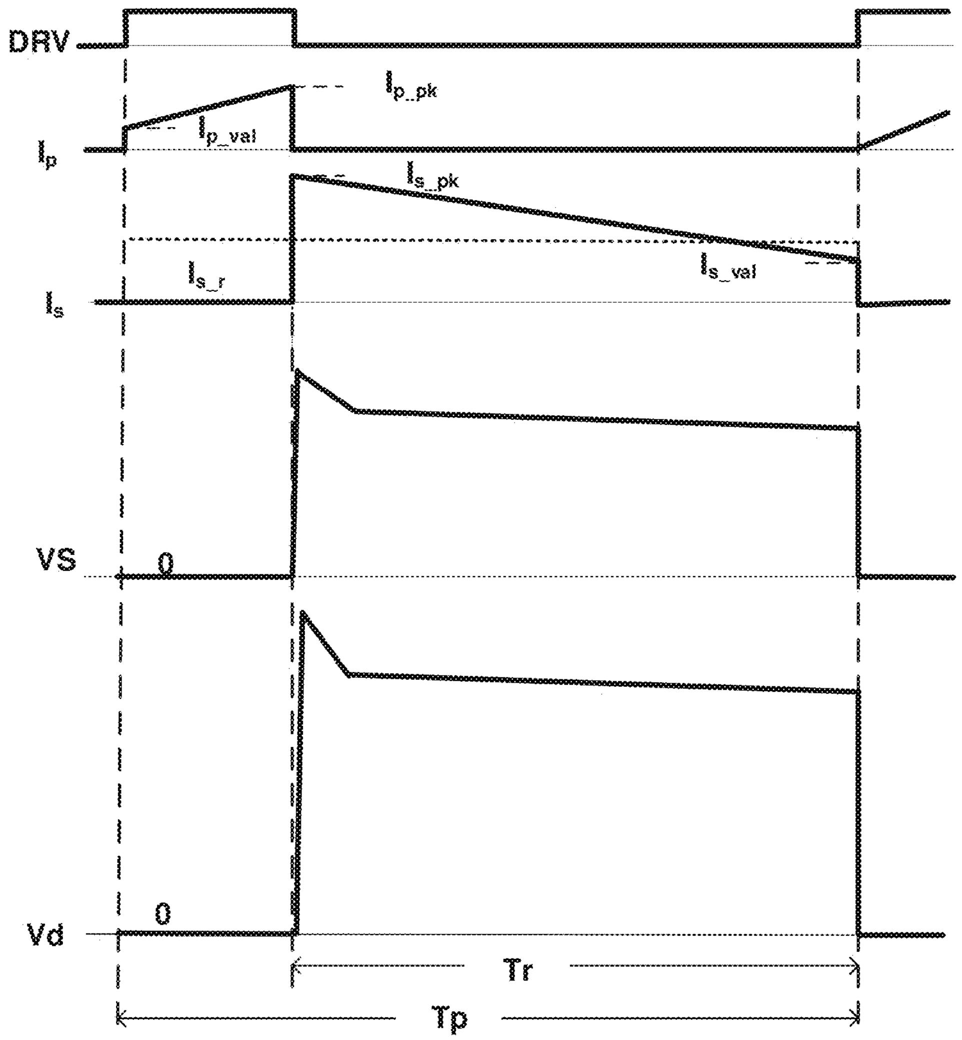
FIG. 10 is a working waveform diagram of a current-limiting circuit of a flyback converter according to another embodiment of the present invention.
Figure 11:
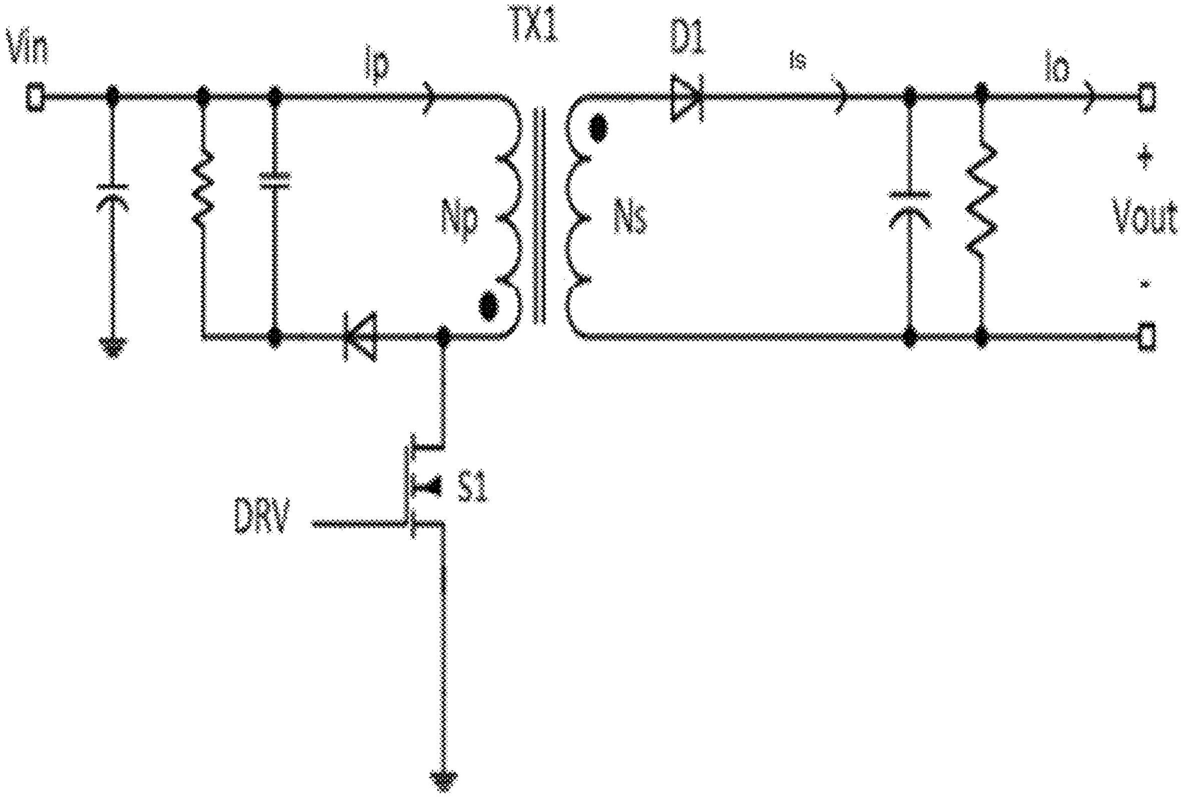
FIG.11 (Prior art)
FIG. 11 is a schematic diagram of a current flyback convert circuit.
Figure 12:
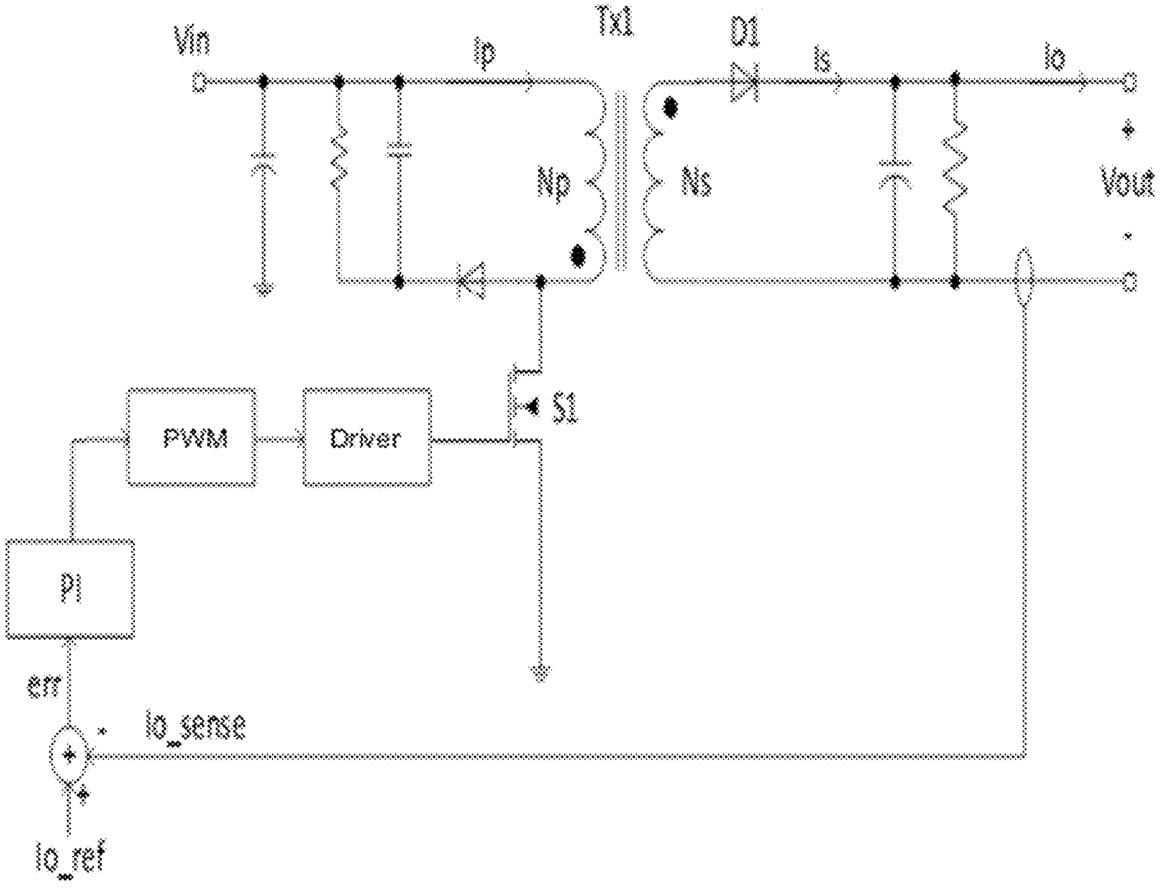
FIG.12(Prior art)
FIG. 12 is a schematic diagram of a current-limiting circuit of the present flyback converter.

As shown in FIG. 10, the transformer operates in the continuous mode. And the initial current of the primary current $I_p$ of the transformer is not zero. The end current of the secondary current $I_s$ of the transformer is also not zero. In this mode of operation, the average value of the secondary output current of the converter during the switching period can be expressed as $$I_{s\_r} = \frac{(I_{p\_pk} + I_{p\_val})N_{ps}}{2}\frac{T_r}{T_p} \quad (10)$$

The current is not proportional to the peak current, but by detecting the average value of the secondary current $I_{s\_r}$ and the known target current $I_{s\_tg}$, the method of (6)-(8) can be used, according to the control quantity of the last period and the current feedback value, gradually deduce a new control quantity to converge the secondary current of the transformer to the target value.

In addition, the flyback converter comprises a converter primary input used for inputting voltage and a converter secondary output used for providing voltage output; and specifically, it comprises a power input end, a power output end, a transformer, a rectifier circuit, a switch unit and a current-limiting circuit as described above; wherein, a first end of the primary input of the transformer is connected to the power input end, a second end of the primary input of the transformer is connected to the first end of the switch unit, a first end of the secondary output of the transformer is connected to an input end of the rectifier circuit, an output end of the rectifier circuit is connected to the power output end, and a second end of the secondary output of the transformer is grounded; The current-limiting circuit is connected to the control end of the switch unit. Specifically, when the converter works, the current control of the converter primary input is realized through the current-limiting circuit, and the secondary current can be limited without loop compensation, and the average value of the output current can be output, so as to directly respond in a switching period and quickly limit the secondary current. The control process is simple and requires fewer parameters for control. and the control quantity of the next period can be corrected according to the secondary current feedback value and the control quantity of the previous period, so that the precision is high. This circuit can also achieve more accurate current control when the transformer works in continuous mode.

It should be understood that the above embodiments only represent the preferred embodiments of the present invention, and the description is more specific and detailed, but it should not be understood as a limitation to the patent scope of the present invention; It should be noted that those skilled in the art can freely combine the above technical features without departing from the concept of the present invention, and can also make a number of modifications and improvements, including the use of digital circuits, which fall within the scope of protection of the present invention; Accordingly, it is intended that all changes and modifications which come within the scope of the appended claims shall be construed accordingly.

What is claimed is:

1. A current-limiting circuit of a flyback converter, wherein the converter comprises a power input end, a power output end, a transformer, a rectifier circuit and a switch unit, a first end of a primary input of the transformer is connected to the power input end, and a second end of the primary input of the transformer is connected to a first end of the switch unit; a first end of a secondary output of the transformer is connected to an input end of the rectifier circuit, an output end of the rectifier circuit is connected to the power output end, and a second end of the secondary output of the transformer is grounded;

the current-limiting circuit comprises a first current measurement unit used for acquiring primary input current of the transformer, a second current measurement unit used for acquiring secondary output current of the transformer, and a first divider, a second divider, a delay unit, a comparison unit and a drive unit;

a first input end of the first divider is connected to the second current measurement unit, a second input end of the first divider is used for inputting a target current value of the converter, an output end of the first divider is connected to a first input end of the second divider, and a second input end of the second divider is connected to an output end of the delay unit; an output end of the second divider is connected to an input end of the delay unit;

a first input end of the comparison unit is connected to the output end of the delay unit, a second input end of the comparison unit is connected to the first current measurement unit, an output end of the comparison unit is connected to an input end of the drive unit, and an output end of the drive unit is used for being connected to a control end of the switch unit.

2. The current-limiting circuit for a flyback converter according to claim 1, wherein the first current measurement unit comprises a detection resistor, a first end of the detection resistor is connected to a second end of the switch unit and an inverting input end of the comparison unit, and a second end of the detection resistor is grounded.

3. The current-limiting circuit of a flyback converter according to claim 1, wherein the second current measurement unit comprises a first sampling resistor, a first differential amplifier, and a first averaging unit;

a first end of the first sampling resistor is connected to the output end of the rectifier circuit and a non-inverting input end of the first differential amplifier, a second end of the first sampling resistor is connected to a positive voltage output of the power output end and an inverting input end of the first differential amplifier, and an output end of the first differential amplifier is connected to an input end of the first averaging unit; an output end of the first averaging unit is connected to the first input end of the first divider.

4. The current-limiting circuit of a flyback converter according to claim 3, wherein the second current measurement unit further comprises a first isolation unit;

an input end of the first isolation unit is connected to the output end of the first differential amplifier, and an output end of the first isolation unit is connected to the input end of the first averaging unit.

5. The current-limiting circuit of a flyback converter according to claim 1, wherein the second current measurement unit comprises a second sampling resistor, a second differential amplifier, and a second averaging unit; a first end of the second sampling resistor is connected to the second end of the secondary output of the transformer and an inverting input end of the second differential amplifier, a second end of the second sampling resistor is connected to a negative voltage output of the power output end and a non-inverting input end of the second differential amplifier, and an output end of the second differential amplifier is connected to an input end of the second averaging unit; an output end of the second averaging unit is connected to the first input end of the first divider.

6. The current-limiting circuit of a flyback converter according to claim 1, wherein the second current measurement unit comprises a first waveform analyzing unit and a first controller;

the first controller is respectively connected to the output end of the delay unit, the output end of the comparison unit, an output end of the first waveform analyzing unit and the first input end of the first divider;

an input end of the first waveform analyzing unit is connected to the second end of the primary input of the transformer;

the first controller is configured to obtain a demagnetization time of the transformer according to a peak current control quantity output by the delay unit, an output period of the comparison unit, and an input voltage of the first end of the switch unit, so as to obtain a voltage detection value corresponding to a mean current of the secondary output of the transformer.

7. The current-limiting circuit of a flyback converter according to claim 6, wherein the first controller outputs a control parameter $V_{is\_r}$ according to the following formula:

$$V_{is\_r} = \frac{V_{ipk\_r} N_{ps}}{2} \frac{T_r}{T_p}$$

wherein, $V_{ipk\_r}$ is a voltage value corresponding to a primary peak current control quantity of the transformer, $N_{ps}$ is a turns ratio of the primary input to the secondary output of the transformer, $T_r$ is the demagnetization time of the transformer and $T_p$ is a switching period of the switch unit, the demagnetization time $T_r$ of the transformer is obtained according to the input voltage of the first end of the switch unit.

8. The current-limiting circuit of a flyback converter according to claim 1, wherein the converter further comprises an auxiliary winding, and the second current measurement unit comprises a first divider resistor, a second divider resistor, a second waveform analyzing unit and a second controller;

the second controller is respectively connected to the output end of the delay unit, the output end of the comparison unit, an output of the second waveform analyzing unit and the first input end of the first divider;

an input end of the second waveform analyzing unit is connected to a first end of the first divider resistor and a first end of the second divider resistor, and a second end of the first divider resistor is connected to a first end of the auxiliary winding, wherein a second end of the auxiliary winding and a second end of the second divider resistor are grounded;

the second controller is configured to obtain a voltage detection value corresponding to a mean current of the secondary output of the transformer according to a peak current control quantity output by the delay unit, an output period of the comparison unit, and a demagnetization time of the transformer detected by the auxiliary winding.

9. The current-limiting circuit of a flyback converter according to claim 8, wherein the second controller outputs a control parameter $V_{is\_r}$ according to the following formula:

$$V_{is\_r} = \frac{V_{ipk\_r} N_{ps}}{2} \frac{T_r}{T_p}$$

wherein, $V_{ipk\_r}$ is a voltage value corresponding to a primary peak current control quantity of the transformer, $N_{ps}$ is a turns ratio of the primary input to the secondary output of the transformer, $T_r$ is the demagnetization time of the transformer and $T_p$ is a switching period of the switch unit, the demagnetization time $T_r$ of the transformer is obtained according to a voltage of the auxiliary winding.

10. The current-limiting circuit of a flyback converter according to claim 1, wherein the second current measurement unit comprises a third differential amplifier, a third averaging unit and a second isolation unit, wherein a non-inverting input end of the third differential amplifier is connected to the input end of the rectifier circuit, an inverting input end of the third differential amplifier is connected to the output end of the rectifier circuit, and an output end of the third differential amplifier is connected to an input end of the second isolation unit; an output end of the second isolation unit is connected to an input end of the third averaging unit, and an output end of the third averaging unit is connected to the first input end of the first divider.

11. A flyback converter, comprising: a power input end, a power output end, a transformer, a rectifier circuit, a switch unit, and the current-limiting circuit according to claim 1;

wherein, a first end of a primary input of the transformer is connected to the power input end, a second end of the primary input of the transformer is connected to a first end of the switch unit, a first end of a secondary output of the transformer is connected to an input end of the rectifier circuit, an output end of the rectifier circuit is connected to the power output end, and a second end of the secondary output of the transformer is grounded;

the current-limiting circuit is connected to a control end of the switch unit.

12. The flyback converter according to claim 11, wherein the first current measurement unit comprises a detection resistor, a first end of the detection resistor is connected to a second end of the switch unit and an inverting input end of the comparison unit, and a second end of the detection resistor is grounded.

13. The flyback converter according to claim 11, wherein the second current measurement unit comprises a first sampling resistor, a first differential amplifier, and a first averaging unit;

a first end of the first sampling resistor is connected to the output end of the rectifier circuit and a non-inverting input end of the first differential amplifier, a second end of the first sampling resistor is connected to a positive voltage output of the power output end and an inverting input end of the first differential amplifier, and an output end of the first differential amplifier is connected to an input end of the first averaging unit; an output end of the first averaging unit is connected to a first input end of the first divider.

14. The flyback converter according to claim 13, wherein the second current measurement unit further comprises a first isolation unit;

an input end of the first isolation unit is connected to the output end of the first differential amplifier, and an output end of the first isolation unit is connected to the input end of the first averaging unit.

15. The flyback converter according to claim 11, wherein the second current measurement unit comprises a second sampling resistor, a second differential amplifier, and a second averaging unit; a first end of the second sampling resistor is connected to the second end of the secondary output of the transformer and an inverting input end of the second differential amplifier, a second end of the second sampling resistor is connected to a negative voltage output of the power output end and a non-inverting input end of the second differential amplifier, and an output end of the second differential amplifier is connected to an input end of the second averaging unit; an output end of the second averaging unit is connected to the first input end of the first divider.

16. The flyback converter according to claim 11, wherein the second current measurement unit comprises a third differential amplifier, a third averaging unit and a second isolation unit, wherein a non-inverting input end of the third differential amplifier is connected to the input end of the rectifier circuit, an inverting input end of the third differential amplifier is connected to the output end of the rectifier circuit, and an output end of the third differential amplifier is connected to an input end of the second isolation unit; an output end of the second isolation unit is connected to an input end of the third averaging unit, and an output end of the third averaging unit is connected to the first input end of the first divider.

17. The flyback converter according to claim 11, wherein the second current measurement unit comprises a first waveform analyzing unit and a first controller;

the first controller is respectively connected to the output end of the delay unit, the output end of the comparison unit, an output end of the first waveform analyzing unit and the first input end of the first divider;

an input end of the first waveform analyzing unit is connected to the second end of the primary input of the transformer;

the first controller is configured to obtain a demagnetization time of the transformer according to a peak current control quantity output by the delay unit, an output period of the comparison unit, and an input voltage of the first end of the switch unit, so as to obtain a voltage detection value corresponding to a mean current of the secondary output of the transformer.

18. The flyback converter according to claim 17, wherein the first controller outputs a control parameter $V_{is\_r}$ according to the following formula:

$$V_{is\_r} = \frac{V_{ipk\_r} N_{ps}}{2} \frac{T_r}{T_p}$$

wherein, $V_{ipk\_r}$ is a voltage value corresponding to a primary peak current control quantity of the transformer, $N_{ps}$ is a turns ratio of the primary input to the secondary output of the transformer, $T_r$ is the demagnetization time of the transformer and $T_p$ is a switching period of the switch unit, the demagnetization time $T_r$ of the transformer is obtained according to the input voltage of the first end of the switch unit.

19. The flyback converter according to claim 11, wherein the converter further comprises an auxiliary winding, and the second current measurement unit comprises a first divider resistor, a second divider resistor, a second waveform analyzing unit and a second controller;

the second controller is respectively connected to the output end of the delay unit, the output end of the comparison unit, an output of the second waveform analyzing unit and the first input end of the first divider;

an input end of the second waveform analyzing unit is connected to a first end of the first divider resistor and a first end of the second divider resistor, and a second end of the first divider resistor is connected to a first end of the auxiliary winding, wherein a second end of the auxiliary winding and a second end of the second divider resistor are grounded;

the second controller is configured to obtain a voltage detection value corresponding to a mean current of the secondary output of the transformer according to a peak current control quantity output by the delay unit, an output period of the comparison unit, and a demagnetization time of the transformer detected by the auxiliary winding.

20. The flyback converter according to claim 19, wherein the second controller outputs a control parameter $V_{is\_r}$ according to the following formula:

$$V_{is\_r} = \frac{V_{ipk\_r} N_{ps}}{2} \frac{T_r}{T_p}$$

wherein, $V_{ipk\_r}$ is a voltage value corresponding to a primary peak current control quantity of the transformer, $N_{ps}$ is a turns ratio of the primary input to the secondary output of the transformer, $T_r$ is the demagnetization time of the transformer and $T_p$ is a switching period of the switch unit, the demagnetization time $T_r$ of the transformer is obtained according to a voltage of the auxiliary winding.

* * * * *